United States Patent [19]

Meyer

[11] 3,827,403

[45] Aug. 6, 1974

[54] ANIMAL TRAINING DEVICE

[75] Inventor: Richard C. Meyer, La Habra, Calif.

[73] Assignees: Arne J. Peterson, Newport Beach; Herold F. Deardorff, Corona, both of, Calif. ; part interest to each

[22] Filed: June 8, 1973

[21] Appl. No.: 368,273

[52] U.S. Cl. .................... 119/29, 119/105, 231/2 E
[51] Int. Cl. .......................................... A01k 15/00
[58] Field of Search .................. 119/29, 1, 105, 96; 325/118, 361, 364; 340/224; 231/2 E

[56] References Cited
UNITED STATES PATENTS

| | | | |
|---|---|---|---|
| 2,623,498 | 12/1952 | Gustavsson | 119/29 X |
| 2,830,556 | 4/1958 | Grams | 119/29 X |
| 3,161,005 | 12/1964 | Ackerson | 119/29 X |
| 3,589,334 | 6/1971 | Doss | 231/2 E X |
| 3,753,421 | 8/1973 | Peck | 119/29 |

*Primary Examiner*—James H. Czerwonky
*Attorney, Agent, or Firm*—Philip M. Hinderstein

[57] ABSTRACT

A urination-defecation trainer for animals comprising an energy transmitting means for defining a limited, chosen area, portable means carried by the animal and attached to its tail for sensing the angular orientation thereof and for providing an output when the animal raises its tail while standing. The portable means carried by the animal also receives the transmitted energy in the chosen area, and physically stimulates or shocks the animal. The portable means is responsive to the sensing means and the receiving means for selectively activating the stimulating or shocking means when the animal raises its tail dependent upon the location of the animal relative to the chosen area.

15 Claims, 8 Drawing Figures

PATENTED AUG 6 1974
3,827,403
SHEET 1 OF 2
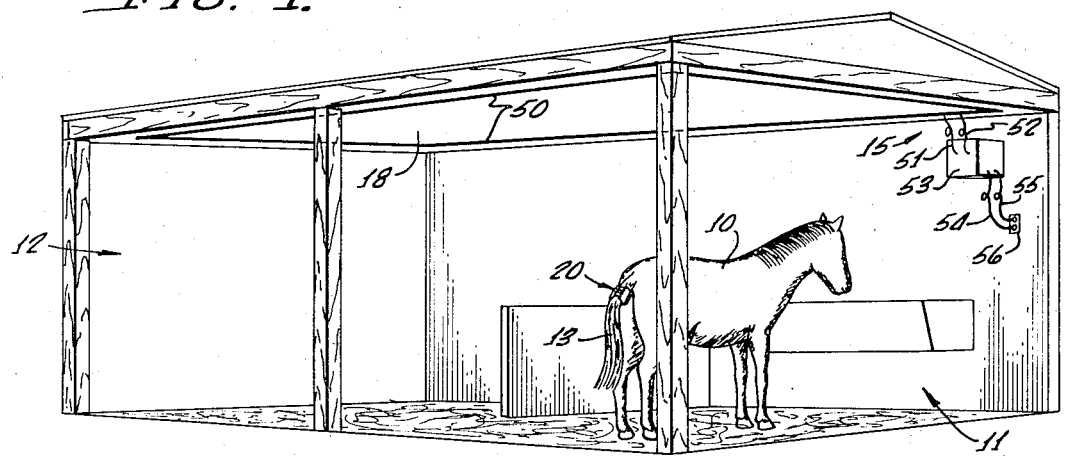
Fig. 1.
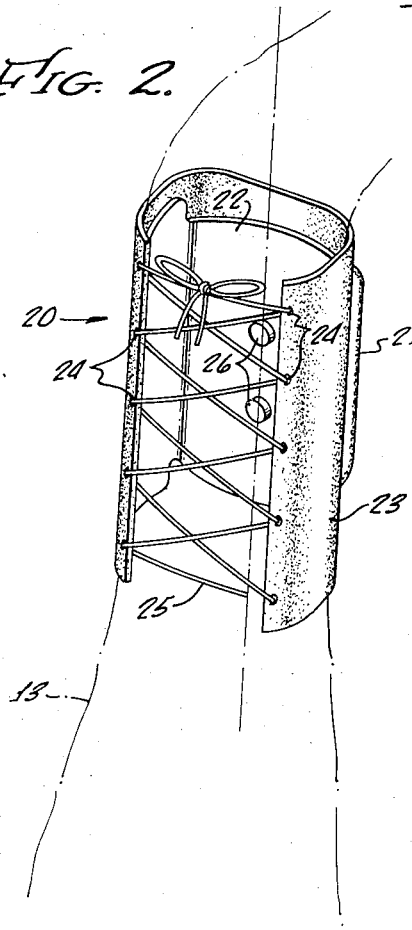
Fig. 2.
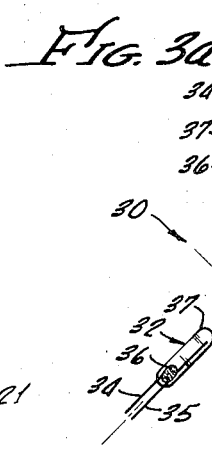
Fig. 3a. Fig. 3b.
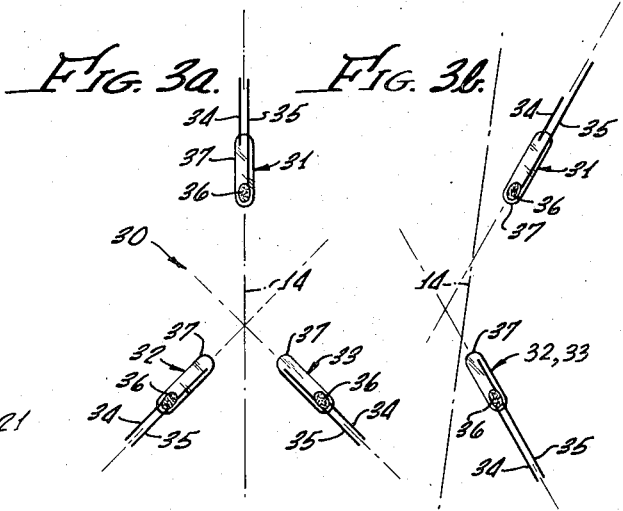
Fig. 4.
Fig. 5.
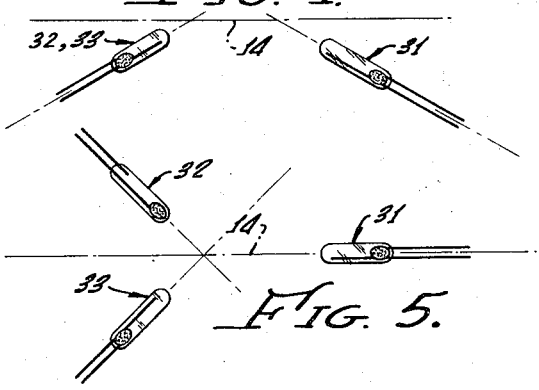

ANIMAL TRAINING DEVICE

BACKGROUND OF THE INVENTION

1. Field of the Invention.

The present invention relates to an animal training device and, more particularly, to a device for training animals not to urinate or defecate in certain areas, such as in their stalls.

2. Description of the Prior Art.

Many animals, most particularly horses, have the habit of urinating and defecating in their stalls. This habit creates numerous problems. In the first instance, this action by the horse creates a smelly and unsightly mess. Secondly, and more importantly, by standing in this disease-supporting mire, the horse often comes down with a degenerating hoof disease, known as thrush.

In order to control or eliminate these problems, horse owners must frequently shovel out the mire and replace it with new earth, straw, and/or wood shavings. However, even with frequent and diligent cleaning of the stalls, hoof disease still occurs, resulting in costly and troublesome medication.

Training programs based primarily on punishment, i.e., whipping the horse whenever it urinates or defecates in its stall, are only partially successful in that the trainer or stable boy is not always around to discipline each violation and also because not all horses respond to the discipline. Thus, heretofore, this training has not been considered a great success, nor especially economical due to individual and protracted training programs.

In an attempt to solve this problem, numerous systems have been proposed to train an animal to urinate and defecate in only a set location. Many of these systems are of the type disclosed in U.S. Pat. Nos. 1,411,312; 2,428,875; 2,623,498; 2,917,022; and 3,370,570. All of these patents relate to animal trainers, but they are primarily intended for use with cows. These patents indicate that each cow stall is designed to maintain the cow in a specific relation with respect to a trough or gutter which receives the droppings from the cow. This being the case, the devices of these patents typically are arranged to insure that the cow is in a specified position at the time of evacuation.

While moderately successful with respect to cows, such systems are far too restrictive for other animals, such as horses. More specifically, the systems of the above-listed patents require the animal to be standing in a specific location and often utilize direct mechanical attachments between the cow's tail and an overhead structure. It is therefor obvious that the cow is prevented from freely moving about the stall area which, as stated previously, limits its usefulness with a horse. Furthermore, with these devices, the animals still defecate in the stall, albeit into a gutter therein.

SUMMARY OF THE INVENTION

In accordance with the present invention, there is provided an animal training device which solves the problems encountered heretofore. The present device is operative to train an animal not to urinate or defecate in certain areas, which areas may be quite large, perhaps encompassed by an entire barn including several stalls. Thus, the animal is permitted freedom of movement within the area and is not required to stand in a specific location for the device to be operative. The present device is entirely portable, being carried in a small package on the animal's tail, eliminating the necessity for direct mechanical connections between the animal and an overhead structure.

The present training device operates to sense the simultaneous occurrence of the horse's preparation for elimination and its location within or outside of a chosen area in order to shock or in other ways stimulate the animal to prevent such elimination. Since the animal carries the present device with it at all times, it is operative continuously and does not require the presence of a trainer or stable boy to discipline each violation. Furthermore, as soon as the animal leaves or enters the chosen area, as the case may be, the present device is inoperative and it is not shocked when eliminating.

Briefly, the preferred embodiment of the present animal training device comprises a means for defining a limited, chosen area, which means may include a transmitter for radiating energy only into such chosen area. A portable apparatus carried by the animal and attached to its tail includes means for sensing the angular orientation thereof and for providing an output when the animal raises its tail while standing, means for receiving the radiated energy in the chosen area, means for stimulating or shocking the animal, such as an electrical shocking device, and means responsive to the output of the sensing means and energy received from the receiving means for activating the shocking means when the animal raises its tail while standing in the chosen area. Still further, the activating means is unresponsive to the output of the sensing means when the animal is outside of the chosen area and is also unresponsive to the output of the sensing means if the animal is lying down or in some other, non-standing position.

OBJECTS

It is therefore an object of the present invention to provide an animal training device.

It is a further object of the present invention to provide a device for training animals not to urinate or defecate in certain preferred areas, such as in their stalls.

It is a still further object of the present invention to provide an animal training device which eliminates direct mechanical connections between the animal and an overhead structure.

It is another object of the present invention to provide an animal training device which is effective at all times within a chosen area but automatically becomes inoperative when the animal leaves the chosen area.

It is still another object of the present invention to provide an animal training device which does not require the constant attention of a trainer or stable boy.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective view showing a horse in a stable with the present animal training device in use;

FIG. 2 is a perspective view of the portable apparatus of FIG. 1, shown in operative position relative to the tail of the horse;

FIG. 3a is a schematic plan-type view of the tail direction sensing switches of the apparatus of FIG. 2, as viewed from the rear, with the horse standing and its tail in the normal downward position;

FIG. 3b is a schematic side view of the tail direction sensing switches of the apparatus of FIG. 2, as viewed from the right side of the horse, with the horse standing and its tail in the normal downward position;

FIG. 4 is a schematic side view like FIG. 3b but showing the angular orientation of the tail direction sensing switches when the horse raises its tail while standing;

FIG. 5 is a schematic plan-type view like FIG. 3a but showing the angular orientation of the tail direction sensing switches when the horse lies down on its right side;

DESCRIPTION OF THE PREFERRED EMBODIMENT

Figure 6:
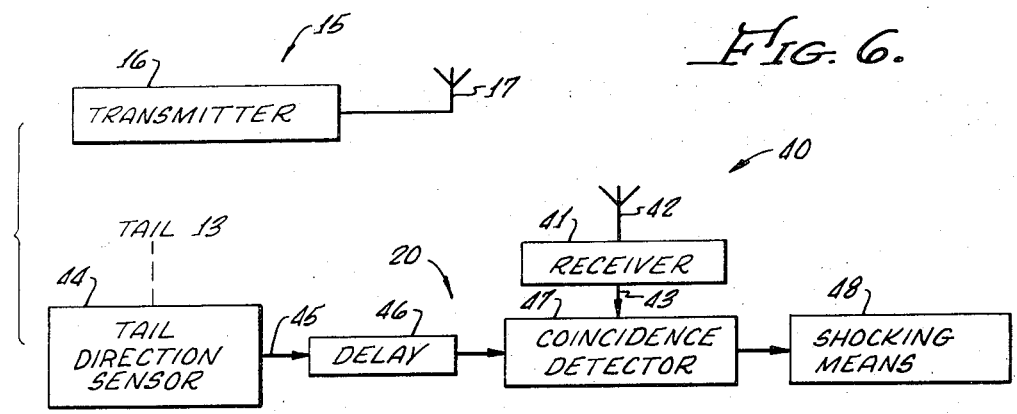
FIG. 6 is a block diagram of the present animal training device.

Referring now to the drawings and, more particularly, to FIG. 1 thereof, there is shown a typical situation in which the present animal training device may effectively be used. FIG. 1 shows a horse 10 positioned within a stall 11 which may be a single stall or may be one of many stalls in an enclosed structure 12. Broadly speaking, the preferred embodiment of the present animal training device comprises a means, generally designated 15, for defining a limited, chosen area, such as the entire area within structure 12, and portable apparatus, generally designated 20, and connected to the tail 13 of horse 10, for giving horse 10 a harmless, pulsed, electrical shock to the tender underside of tail 13, when horse 10 raises its tail 13 while standing in the chosen area. The electrical pulse will cause horse 10 to immediately drop its tail 13 thereby making it very difficult, if not impossible, for the horse to relieve itself. Under bladder stress, horse 10 may initially need to be led out of stall 1 to relieve itself. Once outside of protected structure 12, horse 10 may lift its tail 13 without receiving a shock. After repeating this procedure a few times, horse 10 walks out of structure 12 voluntarily to relieve itself whenever it is electrically shocked attempting to urinate or defecate in stall 11. In a short time, horse 10 does not wait for an electrical shock but is conditioned to relieve itself only outside of structure 12. When horse 10 is so conditioned, area defining means 15 and portable apparatus 20 may be removed.

Referring now to FIG. 2, portable apparatus 20 is designed to be attached to tail 13 of horse 10 and to perform three primary functions. In the first instance, portable apparatus 20 includes means, to be described more fully hereinafter, to sense the angular orientation of tail 13 and to provide a characteristic output when horse 10 raises its tail 13 while standing. Apparatus 20 also includes apparatus for stimulating or otherwise shocking horse 10 under certain specified conditions. Finally, apparatus 20 may carry all circuitry for activating the shocking apparatus in response to the required inputs.

More specifically, apparatus 20 may include a housing 21 connected to a plastic, generally U-shaped member 22. U-shaped member 22 is adapted to be positioned in contact with the underside of tail 13 with the sides thereof partially surrounding tail 13 thereby permitting individual strands of tail 13 to be wrapped around such sides to securely hold member 22 in place. A flexible sheet 23 may be positioned between housing 21 and member 22 in such a manner that it may be at least partially wrapped around tail 13, as shown. The opposite sides of sheet 23 may have a plurality of eyelets 24 therein for receiving a lace 25 which may be fed therethrough and tied in a knot or bow to secure sheet 23 around tail 13.

Apparatus 20 includes a pair of electrodes 26 which extend into the area encompassed by member 22, thereby contacting the underside of tail 13. Electrodes 26 are electrically connected to apparatus in housing 21, to be described more fully hereinafter, which activates the same to give horse 10 a harmless, pulsed, electrical shock under circumstances.

Referring now to FIGS. 3a and 3b, portable apparatus 20 includes means, generally designated 30, for sensing the angular orientation of tail 13 and for providing an output when horse 10 raises its tail 13 while standing. While tail direction sensor 30 may be mechanized in many possible ways, the preferred embodiment of sensor 30 includes three mercury switches 31, 32, and 33, switches 32 and 33 being shown as a single switch in FIG. 3b since switch 32 is coplanar with and hidden behind switch 33. Mercury switches 31–33 are identical and each includes an enclosed cylinder 37 having a pair of electrodes 34 and 35 extending thereinto and a ball of conductive mercury 36 therein. Electrodes 34 are shorter than electrodes 35 and extend only a short distance into cylinders 37. Electrodes 35, on the other hand, extend throughout the entire lengths of the enclosed cylinders 37. Therefore, when mercury switches 31–33 are positioned with electrodes 34 and 35 pointing upwardly, as is the case with switch 31 in FIGS. 3a and 3b, mercury ball 36 is held, by force of gravity, away from and out of contact with electrode 34 so that no electrical connection is made between electrodes 34 and 35. Thus, mercury switch 31 is, in this position, open. On the other hand, when switches 31–33 are positioned with electrodes 34 and 35 pointing downwardly, as is the case with switches 32 and 33 in FIGS. 3a and 3b, mercury ball 36 is brought into contact with both of electrodes 34 and 35, thus permitting electrical conduction therebetween. Thus, switches 32 and 33 are closed when in the positions shown in FIGS. 3a and 3b.

Still referring to FIGS. 3a and 3b, there is shown the normal position of switches 31–33 relative to the position of tail 13, which is represented by line 14. As shown in FIG. 3a, when looking from the rear of horse 10, mercury switch 31 has its electrodes 34 and 35 pointing upwardly and aligned with line 14. Mercury switches 32 and 33, on the other hand, have their electrodes 34 and 35 pointing downwardly and outwardly at 45° angles relative to line 14, on opposite sides thereof. As shown in FIG. 3b, when looking from the side of horse 10, it is seen that line 14 is normally at a slight upward angle. Electrodes 34 and 35 of all of mercury switches 31–33 are rotated towards horse 10 through an angle of approximately 30° relative to line 14. The reason for this arrangement will become more apparent hereinafter.

Referring now to FIG. 6, there is shown a block diagram of the present animal training device, generally designated 40, including area defining means 15 and portable apparatus 20. Area defining means 15 may include a transmitter 16 connected to a suitable antenna 17 for radiating energy only into the chosen area. Transmitter 16 and antenna 17 may be any one of many possible devices for selectively transmitting energy into a limited area. Transmitter 16 may generate a magnetic field or may use radio frequency waves, radioactivity, infrared, ultraviolet, sonic, or electrical capacitance. The preferred embodiment of transmitter 16 and antenna 17 will be described hereinafter with respect to FIGS. 1 and 7.

Portable apparatus 20 includes means for receiving the radiated energy in the chosen area. Such means may include a receiver 41 connected to an antenna 42, receiver 41 and antenna 42 being compatible with transmitter 16 and antenna 17. Thus, antenna 42 may be a magnetic pick-up coil or a suitable antenna associated with a radio receiver, or receiver 41 may be a Geiger counter, a thermocouple, a photocell, a microphone, or an electrical capacitance. In any event, receiver 41 generates a signal on a line 43 whenever antenna 42 and receiver 41 are in the chosen area in which transmitter 16 and antenna 17 radiate energy.

Portable apparatus 20 also includes a tail direction sensor 44 mechanically connected to tail 13, sensor 44 preferably comprising mercury switches 31–33. Tail direction sensor 44 is operative to sense the angular orientation of tail 13 and, according to the present invention, provide a characteristic output on a line 45 whenever horse 10 raises its tail 13 while standing. This output is applied via a delay circuit 46 to a first input of a coincidence detector 47 which receives, at its other input, the signal on line 43 from receiver 41. Delay 46 is included in apparatus 20 so that detector 47 is not activated if horse 10 only lifts its tail momentarily. Delay 46 would typically require tail 13 to remain elevated for approximately 2 seconds before further processing of the output from sensor 44.

Portable apparatus 20 further includes means, generally designated 48, for stimulating or shocking horse 10 under certain defined conditions. For this purpose, shocking means 48 may include the electrodes 26 described previously with regard to FIG. 2. Alternatively, means 48 may incorporate other forms of stimulus and may utilize a pin prick, a pincher, vibration, heat, a visual or audible alarm, a slap, or any other device to stimulate or shock horse 10 under certain defined conditions.

Coincidence detector 47 is responsive to the outputs of receiver 41 and tail direction sensor 44 for activating shocking means 48 dependent upon the angular orientation of tail 13 and the location of horse 10 relative to the chosen area. According to the preferred embodiment of the invention, the chosen area is to be the protected area and coincidence detector 47 activates means 48 in response to the output from sensor 44, indicating that horse 10 has raised its tail 13 while standing, when horse 10 is in the chosen area, coincidence detector 47 being non-responsive to the output from tail direction sensor 44 when horse 10 is outside of the chosen area. Alternatively, transmitter 16 and antenna 17 may be operative to define a preferred area in which it is desired that horse 10 urinate and defecate, such as corner of a corral. In this case, coincidence detector 47 would be operative to activate shocking means 48 in response to the output from tail direction sensor 44 only when horse 10 is away from the chosen area, detector 47 being non-responsive to the output from sensor 44 when horse 10 is inside of the chosen area. In any event, it is seen that coincidence detector 47 either looks for coincidence between the signals on lines 43 and 45 or looks for the absence of such coincidence to activate means 48.

Figure 7:
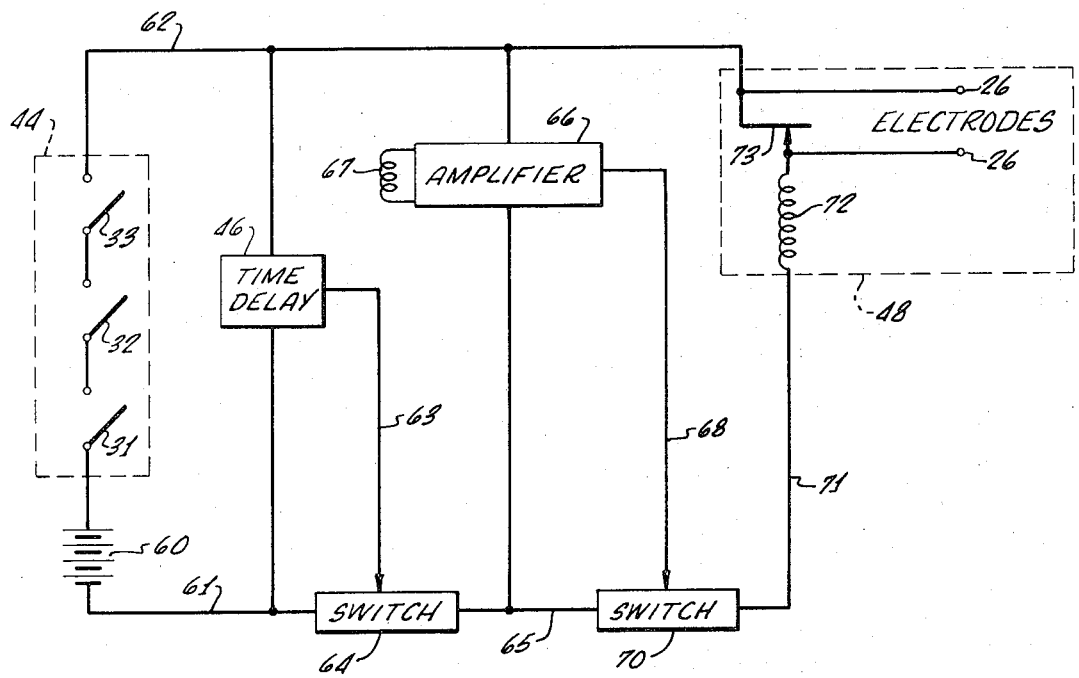
FIG. 7 is a more detailed block diagram of the preferred embodiment of the present animal training device.

Referring now to FIGS. 1 and 7, there is shown a preferred embodiment of animal training device 40. More specifically, FIG. 1 shows a preferred embodiment of area defining means 15 including a coil 50 of conductive wire, the opposite ends 51 and 52 of which are connected to the secondary of a step-down transformer 53. The primary of transformer 53 is connected via leads 54 and 55 to a suitable source 56 of AC power, such as a standard wall outlet. As shown in FIG. 1, coil 50 may be mounted on the ceiling 18 of structure 12, above horse 10, or at any other convenient location, so as to define the limits of the chosen area. Coil 50 generates an AC electromagnetic field which has a substantial strength in an area normal to the plane of coil 50 and limited horizontally by the horizontal dimensions of coil 50. Outside of this area, the electromagnetic field is substantially weaker. The reason for step-down transformer 53 is so that coil 50 is at a low voltage, thereby eliminating the possibility for a shock if contacted, and also to provide a voltage which is more compatible with the few turns of wire of coil 50.

Referring now to FIG. 7, there is shown a more detailed block diagram of portable apparatus 20 which may be attached to tail 13 of horse 10. Apparatus 20 includes a battery 60 connected in series with mercury switches 31, 32, and 33 of tail direction sensor 44. A first lead 61 is connected between one side of battery 60 and one side of time delay 46, the other side of time delay 46 being connected to a lead 62 which is also connected to tail direction sensor 44. Thus, a series circuit is established between battery 60, tail direction sensor 44, and time delay 46.

Time delay 46 generates an output on a lead 63 which is applied to the gating terminal of a first switch 64. Switch 64 is connected between lead 61 and a lead 65, the latter being connected to a first power input terminal of an amplifier 66, the other power input terminal of which is connected to lead 62. The signal input terminals of amplifier 66 are connected to a coil 67 which is positioned within housing 21 so as to be responsive to the electromagnetic field established by coil 50. The signal output terminal of amplifier 66 is applied over a lead 68 to the gating terminal of a second switch 70 which is connected between lead 65 and a lead 71.

Leads 62 and 71 are connected to shocking means 48 which may be a self-interrupting relay 72 connected in series with a switch 73 connected across electrodes 26. In other words, relay 72 may be of the type which normally maintains switch 73 closed until such time as a voltage appears thereacross, such as would occur when switches 31–33, 64, and 70 are simultaneously closed. At this time, relay 72 would be activated to open switch 73, thereby applying a high inductive voltage spike across electrodes 26, caused by the collapsing magnetic field of relay coil 72. With relay 72 deenergized, switch 73 closes, shorting electrodes 26. As soon as switch 73 closes, relay 72 is again activated and the sequence repeats. This is one of many techniques for generating an AC signal across electrodes 26 from a DC battery 60.

OPERATION

In operation, coil 50 defines an area in which it is desired to train horse 10 not to evacuate. To do this, the primary of transformer 53 is connected to AC power source 56, thereby energizing coil 50 and generating an electromagnetic field within structure 12. This electromagnetic field is sensed by receiving coil 67 and applied to the signal input terminals of amplifier 66. Amplifier 66 receives its power from battery 60, which may be a portable battery mounted within housing 21. Therefore, in order for amplifier 66 to respond to a signal at its signal input terminals, each of switches 31–33 and 64 must be closed. Switch 64 is controlled by time delay 46 whereas switches 31–33 are controlled by the angular orientation of tail 13 of horse 10.

More specifically, when horse 10 is standing with tail 13 lowered, switches 31–33 are in the positions shown in FIGS. 3a and 3b where it is seen that while switches 32 and 33 are closed, switch 31 is open thereby providing no power between leads 61 and 62. If, while standing, horse 10 lifts tail 13, switch 31 closes, even before tail 13 reaches the horizontal position. Thus, the configuration of switches 31–33 with horse 10 standing and tail 13 horizontal is shown in FIG. 4 where, as in FIG. 3b, switches 32 and 33 are shown as a single switch since switch 32 is coplanar with and hidden behind switch 33. In any event, with tail 13 horizontal, it is seen that all of switches 31–33 are now closed. Battery 60 is thus connected between leads 61 and 62, applying power to time delay 46.

Time delay 46 may be a conventional RC circuit which, when a charge of sufficient magnitude is developed, triggers switch 64 via lead 63. As soon as switch 64 is closed, power is now applied between lead 62 and 65, thereby energizing amplifier 66. If, at this time, horse 10 is standing in the chosen area, such that a signal is received by coil 67, this signal is amplified and applied via lead 68 to close normally-open switch 70. When this occurs, the voltage of battery 60 now appears between lines 62 and 71, across self-interrupting relay 72. This voltage causes relay 72 to open switch 73 thereby connecting battery 60 directly to electrodes 26. As described previously, switch 73 starts buzzing and a series of high amplitude voltage spikes is applied to the underside of tail 13 of horse 10 via electrodes 26. This causes horse 10 to immediately drop its tail 13 to cease preparation for elimination. As soon as tail 13 is lowered to the position shown in FIG. 3b, switch 31 opens, immediately removing the voltage across electrodes 26.

If horse 10 now leaves structure 12 and lifts its tail 13, time delay 46 is again activated to close switch 64 to apply power to amplifier 66. However, with horse 10 now away from the field created by coil 50, coil 67 receives little or no energization and the voltage applied to the signal input terminals of amplifier 66 is insufficient to close switch 70. As long as switch 70 remains open, the voltage of battery 60 is prevented from being applied to relay 72. Thus, when horse 10 is outside of protected structure 12, no electrical shock is received and elimination continues without interruption.

If it were not for switches 32 and 33, horse 10 might be shocked either by swinging his tail back and forth while standing or by lying down. As shown in FIG. 5, if horse 10 lies down on its right side, thereby rotating line 14 through an angle of 90°, switch 31 may well close. At this time, however, switch 32 will open preventing the completion of the circuit through tail direction sensor 44. If horse 10 lies down on its left side, switch 32 will remain closed but switch 33 will open. Many other arrangements of switches 31–33 will be apparent to those skilled in the art, the only requirement being that the circuit between lead 62 and battery 60 be closed only when horse 10 raises its tail 13 while standing.

It will be obvious to those skilled in the art that the use of animal training device 40 is not limited to structure 12 including one or more stalls 11. Other restricted areas could be a corral or a special walking or feeding area. It will also be evident to those skilled in the art that animal training device 40 may be used to define an area into which horse 10 would go whenever it feels the urge to urinate or defecate. This can be done simply by first placing coil 50 and transformer 53 in the new area, such as a corner of a corral. Then, the connection between switch 70 and the output of amplifier 66 would be reversed so that amplifier 66 operates to open a normally closed switch 70. In other words, switches 31–33 would continue to sense when horse 10 raises its tail 13 while standing. When this occurred and time delay 46 closed switch 64, the voltage of battery 60 would normally be applied to relay 72 through normally closed switch 70. However, if horse 10 is in the chosen area, coil 67 senses the signal from coil 50 and applies a signal to amplifier 66 which amplifies and applies such signal via line 68 to open normally closed switch 70, thereby removing the voltage from relay 72.

It can therefore be seen that in accordance with the present invention, there is provided an animal training device 40 which solves the problems encountered heretofore. Device 40 is operative to train an animal, such as horse 10, not to urinate or defecate in certain areas, which areas might be quite large, perhaps encompassed by an entire barn including several stalls. Thus, the animal is permitted freedom of movement within the area and is not required to stand in a specific location for the device to be operative. Alternatively, the present device may be used to train an animal to urinate or defecate only in a certain area, permitting the animal freedom of movement into all other areas.

The present device is entirely portable, being carried in a small package on tail 13 of animal 10, eliminating the necessity for a direct mechanical connection between horse 10 and an overhead structure. Device 40 operates to sense the simultaneous occurrence of the horse's preparation for elimination, namely the lifting of its tail, and its position within or away from a chosen area to shock or in other ways stimulate horse 10 to prevent such elimination. As soon as the horse is shocked, it lowers its tail 13 which has the effect of immediately opening switch 31, removing power from shocking means 48. When horse 10 is led or voluntarily moves outside of or into the chosen area, as the case may be, it receives no shock and is able to continue elimination without interruption. Thus, horse 10 wears apparatus 20 for a period of time to train it to eliminate only in certain areas, away from stall 11. When this training is completed, apparatus 20 is removed and horse 10 chooses the right area by force of habit.

Since horse 10 carries portable apparatus 20 with it at all times, device 40 is operative continuously and does not require the presence of a trainer or stable boy to discipline each violation. Thus, the present device is essentially 100 percent effective.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:
1. An animal training device comprising:
means for defining a limited, chosen area; and
portable means carried by said animal, said portable means including:
direction sensing means attached to the tail of said animal for sensing the angular orientation of said tail relative to the remainder of the animal's body;
means for physically stimulating or shocking said animal; and
means responsive to said area defining means and said tail direction sensing means for activating said simulating or shocking means dependent upon both the angular orientation of said animal's tail relative to its body and the location of said animal relative to said chosen area.

2. An animal training device according to claim 1 wherein said tail direction sensing means provides a characteristic output when said animal raises its tail while standing and wherein said activating means is responsive to said output.

3. An animal training device according to claim 2 wherein said activating means activates said stimulating or shocking means in response to said output when said animal is in said chosen area, said activating means being unresponsive to said output when said animal is outside of said chosen area.

4. An animal training device according to claim 2 wherein said activating means activates said stimulating or shocking means in response to said output when said animal is away from said chosen area, said activating means being unresponsive to said output when said animal is inside of said chosen area.

5. An animal training device according to claim 2 wherein said tail direction sensing means comprises:
a switch positioned so as to be in a first condition when said tail is lowered and in a second condition when said tail is elevated.

6. An animal training device according to claim 5 wherein said switch comprises:
a mercury switch including a pair of electrodes and a ball of conductive mercury adapted to complete an electrical circuit between said electrodes in certain positions of said switch.

7. An animal training device according to claim 5 wherein said switch is closed when said animal raises its tail and wherein said tail direction sensing means further comprises:
a second switch connected in series with said first-mentioned switch, said second switch being positioned so as to be closed when said animal is standing and to be opened when said animal lies down so that said output is provided only when said animal raises its tail while standing.

8. An animal training device according to claim 1 wherein said means for defining said chosen area comprises:
transmitting means for radiating energy only into said chosen area, and wherein said portable means further includes:
means carried by said animal for receiving said radiated energy in said chosen area, said activating means being responsive to said receiving means.

9. An animal training device according to claim 8 wherein said activating means comprises:
a coincidence detector responsive to said tail direction sensing means and said receiving means for activating said stimulating or shocking means when said animal raises its tail and radiated energy is simultaneously received by said receiving means.

10. An animal training device according to claim 8 wherein said activating means comprises:
a coincidence detector responsive to said tail direction sensing means and said receiving means for activating said stimulating or shocking means when said animal raises its tail and no radiated energy is received by said receiving means.

11. An animal training device according to claim 8 wherein said transmitting means comprises:
a coil of conductive wire positioned immediately above said chosen area; and
means for connecting said coil to a source of AC power, said coil generating an AC electromagnetic field in said chosen area.

12. An animal training device according to claim 11 wherein said receiving means comprises:
a coil of conductive wire carried by said animal and responsive to said electromagnetic field generated by said transmitting coil for generating an AC voltage when in said chosen area.

13. An animal training device according to claim 12 wherein said tail direction sensing means comprises a switch positioned so as to close when said animal raises its tail while standing and wherein said activating means comprises:
a battery; and
an amplifier, said battery applying power to said amplifier when said switch is closed, said amplifier having a signal input terminal connected to said receiving coil, said amplifier having a signal output terminal operatively connected to activate said stimulating or shocking means whereby said amplifier activates said stimulating or shocking means when said switch closes and said receiving coil senses an AC electromagnetic field.

14. An animal training device according to claim 1 wherein said portable means further includes:
delay means operatively connected between said tail direction sensing means and said activating means for delaying activation of said stimulating or shocking means for a predetermined, short interval of time.

15. An animal training device according to claim 1 wherein said stimulating or shocking means applies a harmless, pulsed, electrical shock to said tail of said animal.

* * * * *